(12) United States Patent
Traubenkraut et al.

(10) Patent No.: US 9,108,281 B2
(45) Date of Patent: Aug. 18, 2015

(54) MULTI-SPINDLE FASTENING SYSTEM

(75) Inventors: Glen D. Traubenkraut, Frankenmuth, MI (US); Leslie A. Guerrero, Lapeer, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 937 days.

(21) Appl. No.: 13/042,847

(22) Filed: Mar. 8, 2011

(65) Prior Publication Data

US 2012/0227254 A1 Sep. 13, 2012

(51) Int. Cl.
| | | |
|---|---|---|
| *B25C 3/00* | (2006.01) | |
| *B25B 13/48* | (2006.01) | |
| *B23P 19/06* | (2006.01) | |
| *B23Q 3/00* | (2006.01) | |
| *B21D 28/34* | (2006.01) | |
| *B32B 37/10* | (2006.01) | |

(52) U.S. Cl.
CPC ............... *B23P 19/069* (2013.01); *B21D 28/34* (2013.01); *B23Q 3/00* (2013.01); *B32B 37/10* (2013.01); *Y10T 29/53004* (2015.01)

(58) Field of Classification Search
CPC .......... B23Q 3/00; B21D 28/34; B32B 37/10
USPC .................... 81/57.36; 29/465, 466, 700, 798
See application file for complete search history.

(56) References Cited

U.S. PATENT DOCUMENTS

| | | | | |
|---|---|---|---|---|
| 4,685,494 | A  * | 8/1987 | Lofgren et al. .................. | 141/65 |
| 5,111,573 | A  * | 5/1992 | Ito et al. ............................ | 483/1 |
| 6,039,680 | A  * | 3/2000 | Oketani et al. .................. | 483/57 |
| 6,295,710 | B1 * | 10/2001 | Roberts et al. ............. | 29/407.01 |
| 6,345,938 | B1 * | 2/2002 | Schleicher et al. ........... | 408/1 R |
| 6,527,686 | B1 * | 3/2003 | Houser et al. ..................... | 483/1 |

* cited by examiner

*Primary Examiner* — Monica Carter
*Assistant Examiner* — Danny Hong
(74) *Attorney, Agent, or Firm* — Quinn Law Group, PLLC

(57) ABSTRACT

A fastening system includes a housing and a plurality of spindles. The plurality of spindles are not fixedly attached to the housing. The fastening system has a first axis. Each of the plurality of spindles is moveable parallel to the first axis. The fastening system also has a second axis, which is substantially perpendicular to the first axis. Each of the plurality of spindles is also moveable parallel to the second axis. A template member is configured to locate the plurality of spindles, and is not permanently fastened to the housing.

11 Claims, 4 Drawing Sheets

MULTI-SPINDLE FASTENING SYSTEM

TECHNICAL FIELD

This disclosure relates to multi-spindle fastening systems for use in manufacturing processes such as the assembly of vehicle parts.

BACKGROUND

In industry, numerous types of fasteners may be used to attach workpieces together or to attach other components to workpieces. Manufacturing and assembly facilities may use equipment of various sizes to drive or install multiple fasteners at substantially the same time. The equipment may be hard-tooled, such that it is generally fixed in the facility for a single purpose, function, or production line.

SUMMARY

A fastening system is provided. The fastening system includes a housing and a plurality of spindles. The plurality of spindles are not fixedly attached to the housing. A first axis is defined for the fastening system. Each of the plurality of spindles is moveable parallel to the first axis. A second axis is also defined for the fastening system and is substantially perpendicular to the first axis. Each of the plurality of spindles is also moveable parallel to the second axis, such that each of the plurality of spindles is independently moveable along two axes. A template member is configured to locate the plurality of spindles. The template member is not permanently fastened to the housing.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
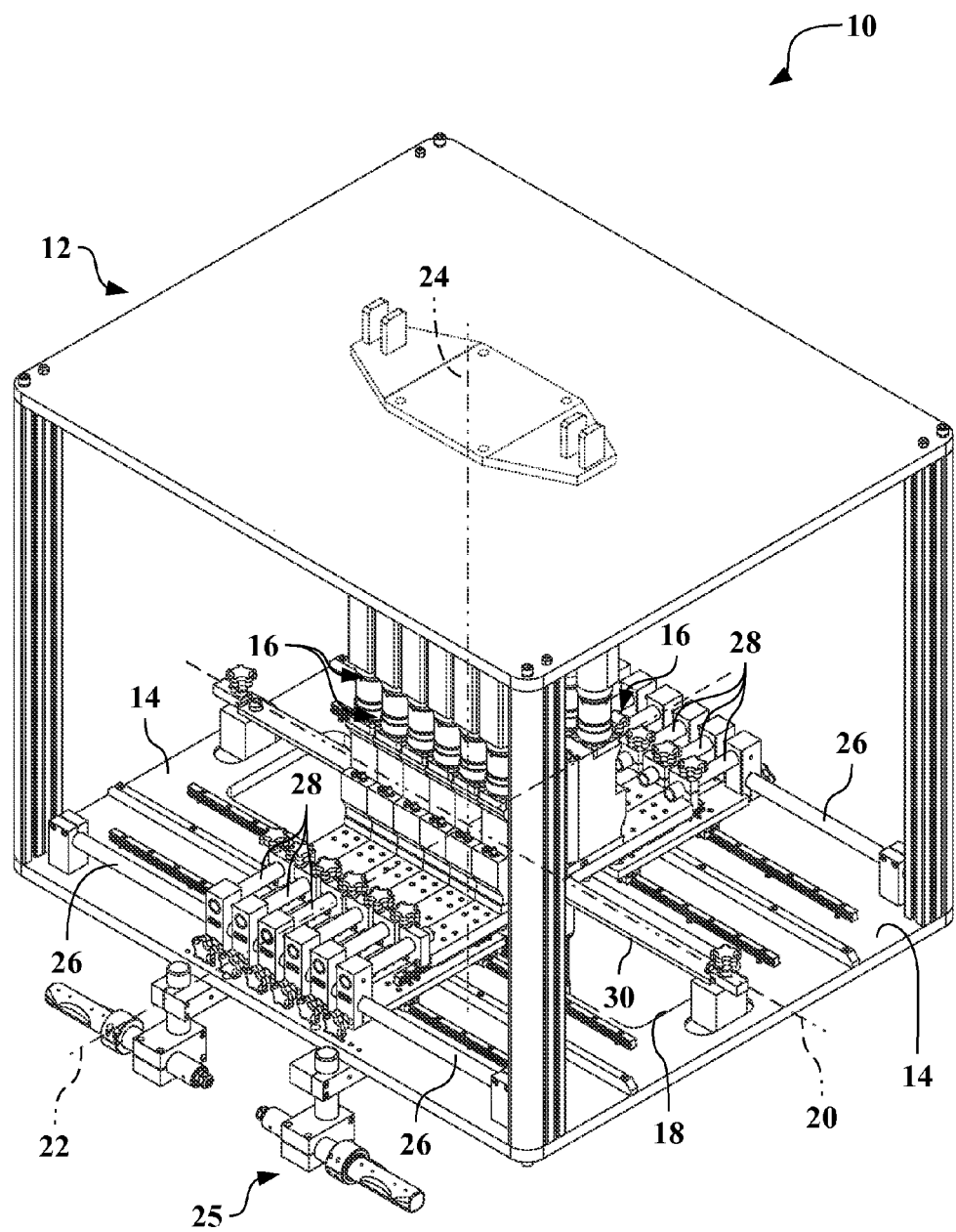
FIG. 1 is a schematic, isometric view of a multi-spindle fastening system shown adjusted for substantially-minimum spacing.
Figure 2:
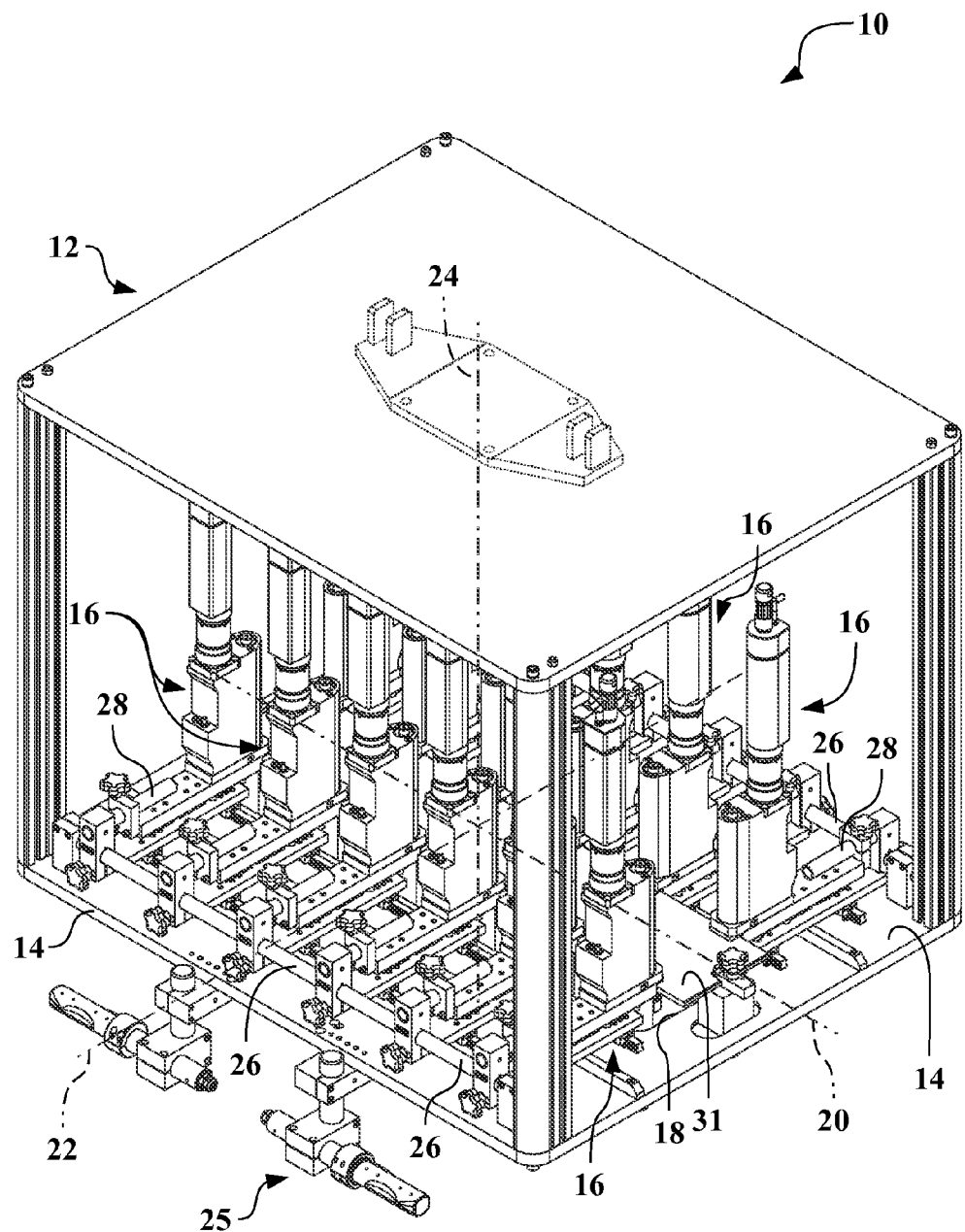
FIG. 2 is a schematic, isometric view of the multi-spindle fastening system of FIG. 1, shown adjusted for substantially-maximum spacing.

Referring to the drawings, wherein like reference numbers correspond to like or similar components whenever possible throughout the several figures, there is shown in FIG. 1 and FIG. 2 a schematic diagram of a fastening system 10. The fastening system 10 shown may be used to attach numerous fasteners (not shown, in FIGS. 1 and 2, shown as 33 in FIG. 3) to numerous workpieces (not shown). FIG. 1 shows the fastening system 10 adjusted for substantially-minimum spacing and FIG. 2 shows the fastening system 10 adjusted for substantially-maximum spacing. Features and components shown in other figures may be incorporated and used with those shown in FIGS. 1 and 2.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The fastening system 10 includes a housing 12 that provides support and structure. The housing 12 has a base plate 14 located at the bottom (relative to FIGS. 1 and 2) of the housing 12. In the configuration shown, the base plate 14 is substantially planar and the housing 12 is substantially cubic. However the shapes shown are not limiting and the base plate 14 may be, without limitation, multi-planer (such as tented or pyramidal), concaved, or cylindrical.

The housing 12 supports a plurality of spindles 16. However, as described herein, the spindles 16 are not fixedly attached to the housing 12. The spindles 16 are freely, and independently adjustable with at least two degrees of freedom. A work opening 18 is formed in the housing 12 or the base plate 14, and provides access for the spindles 16 to reach the workpieces. In the configuration shown, there are twelve spindles 16, which are shown arranged in a two-by-six matrix. Neither the total number of spindles 16 nor the arrangement of the spindles 16 is limiting. Furthermore, the spindles 16 may be arranged in a completely-asymmetric pattern or alignment.

The fastening system 10 includes a first axis 20, which may be referred to as an x-axis. Each of the spindles 16 is independently moveable parallel to, or in the direction of, the first axis 20. The fastening system 10 also includes a second axis 22, which may be referred to as a y-axis and is substantially perpendicular to the first axis 20. The axes labeled herein are illustrative only and any specific axis may be denoted x, y, z, or another term. Each of the spindles 16 is independently moveable parallel to, or in the direction of, the second axis 22. Therefore, each of the spindles 16 is independently moveable in two directions or degrees of freedom relative to the housing 12.

The housing 12 may be moveable along a third axis 24, which may be referred to as a z-axis. Through commands entered at a control interface 25, a worker or operator of the fastening system 10 may raise and lower the fastening system 10 to facilitate, for example and without limitation: interaction with workpieces, adjustment of the fastening system 10, or maintenance of the fastening system 10.

The fastening system 10 includes one or more first linear guides 26, which are substantially parallel to the first axis 20. The fastening system 10 further includes a plurality of second linear guides 28 which are substantially parallel to the second axis 22. As used herein, designation as "first" or "second" is not limiting.

The second linear guides 28 are moveably attached to the first linear guides 26. Furthermore, each of the spindles 16 is moveably attached to one of the second linear guides 28. Therefore, the first linear guides 26 and the second linear guides 28 collectively allow each of the spindles 16 to move parallel to both the first axis 20 and the second axis 22. The fastening system 10 includes additional rails and supports (not separately numbered) to assist in guiding and supporting the spindles 16 during and after adjustment or movement into a new pattern.

In order to adjust the fastening system 10 for any specific project, such as for a specific bolt pattern for an engine (not shown) each spindle 16 is moved along its respective first linear guide 26 and second linear guide 28 to a specific position in the work opening 18. The interface between the spindles 16, the second linear guides 28, and the first linear guides 26 are selectively lockable to retain the spindles 16 in the desired location and form the desired pattern, and then to release to the spindles 16 to move to another desired pattern.

FIG. 1 shows a first template member 30 and FIG. 2 shows a second template member 31, both of which are configured to attach to the housing 12. However, the template members 30 and 31 are not permanently fastened to the housing 12, such that each of the different template members 30 and 31 (and others) may be easily removed and replaced for use with the fastening system 10.

The template members 30 and 31 are configured to locate the spindles 16 relative to the housing 12 and to the first axis 20 and the second axis 22. Therefore in order to switch between the minimum-distance, or close, pattern shown in FIG. 1 and the maximum-distance, or wide, pattern shown in FIG. 2: the spindles 16 are retracted away from the first template member 30; the first template member 30 is removed; the second template member 31 is placed into the housing 12; and the spindles 16 are adjusted to be adjacent to the second template member 31. No disassembly of the spindles 16 is required, and no reconfiguration or retooling of the housing 12 or the base plate 14 is required. Furthermore, the spindles 16, individually and as a group, are adjustable by a single user or operator without substantial equipment, retooling, or physical effort.

The first template member 30 and the second template member 31 may be further configured to react or counteract torque generated by the spindles 16. As the spindles 16 are used to drive fasteners (such as bolts), large amounts of torque may be created by each of the spindles 16. Therefore, the first template member 30 and the second template member 31 also provide reactive structure to balance that torque. The shape of the interface between the spindles 16 and the first template member 30 and second template member 31 is illustrative only, and other shapes may be used to provide positive location and torque reaction for the spindles 16.

In the fastening system 10 shown in FIG. 1, the first template member 30 is substantially coaxial with the first axis 20, such that the first template member 30 is a substantially-centrally located relative to the base plate 14 and the spindles 16. However, the first template member 30 may be coaxial with either one of the first axis 20 and the second axis 22. The spindles 16 may be arranged in any symmetric or asymmetric pattern within the limits of the housing 12, the base plate 14, and the spindles 16.

Note that the first axis 20 and the second axis 22 may be defined differently relative to the housing 12. Furthermore, other locations for the first template member 30 may be used, and the first template member 30 may be configured to be positioned at an angle relative to the first axis 20 or the second axis 22.

Figure 3:
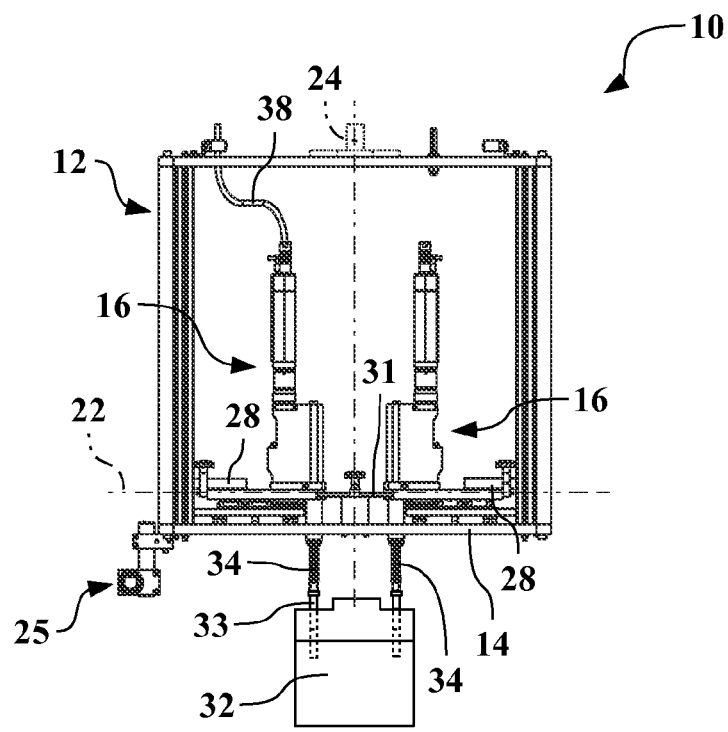
FIG. 3 is a schematic, side view of the multi-spindle fastening system shown in FIGS. 1 and 2, showing a planar base plate.

Referring now to FIG. 3, and with continued reference to FIGS. 1-2, there is shown a schematic, side view of the fastening system 10 shown in FIGS. 1 and 2. The fastening system 10 is again positioned for substantially-maximum spacing of the spindles 16, based upon the second template member 31. The fastening system 10 is shown above a workpiece 32, which is configured to receive fasteners 33 (which are shown partially engaged with the workpiece 32).

Each of the plurality of spindles 16 (two of which are viewable from the side) drives a tool, such as a socket 34. The sockets 34 are substantially parallel to the axis of rotation of the spindles 16, which are parallel to the third axis 24 in this configuration. As the fastening system 10 is lowered along the third axis 24, or the workpiece 32 is raised along the third axis 24, the spindles 16 are driven, such as by a power source 38 to apply torque to the fasteners 33 and to drive the fasteners 33 into the workpiece 32.

The spindles 16 may be powered by, for example and without limitation: AC or DC electricity, pneumatic pressure or vacuum, or hydraulics. Furthermore, the housing 12 and the fastening system 10, in general, may be powered by numerous means.

Additional movement or adjustability along the third axis 24, relative to the workpiece 32 or the housing 12, may be achieved with the spindles 16. For example and without limitation, the spindles 16 may have spring-loaded sockets 34 or the spindles 16 may be configured to raise and lower the sockets 34. The sockets 34 may also be of variable length, providing additional flexibility in the number and type of workpieces 32 with which the fastening system 10 may be used.

Figure 4:
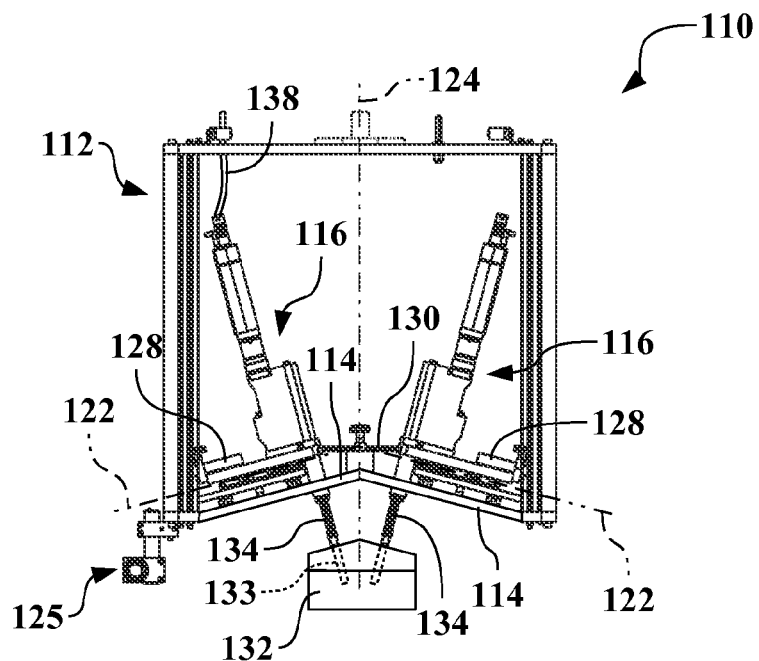
FIG. 4 is a schematic, side view of another multi-spindle fastening system, which includes an angular, dual plane base plate.

Referring now to FIG. 4, and with continued reference to FIGS. 1-3, there is shown a schematic, side view of a fastening system 110, which is similar that shown in FIGS. 1-3.

The fastening system 110 includes a housing 112 that provides support and structure. The housing 112 has a base plate 114 located at the bottom (relative to FIG. 4) of the housing 112. In the configuration shown, the base plate 114 is has two planes at an angle to each other.

The housing 112 supports a plurality of spindles 116, which are not fixedly attached to the housing 112. The spindles 116 are freely, and independently adjustable with at least two degrees of freedom. Two work openings (not viewable from the side) are formed in the base plates 114, and provide access for the spindles 116 to reach a workpiece 132.

A first axis of the fastening system 110 is perpendicular to the view plane of FIG. 4. Each of the spindles 116 is independently moveable parallel to, or in the direction of, the first axis (not viewable, coming into and out of the view in FIG. 4). The fastening system 110 also includes two second axes 122, which are parallel to each of the planes of the base plate 114. The second axes 122 are both substantially perpendicular to the first axis. Each of the spindles 116 is independently moveable parallel to, or in the direction of, the second axes 122. Therefore, each of the spindles 116 is independently moveable in two directions or degrees of freedom relative to the base plate 114, along the first axis and one of the second axes 122. The housing 112 may be moveable along a third axis 124. Through commands entered at a control interface 125, a worker or operator of the fastening system 110 may raise and lower the fastening system 110.

The fastening system 110 includes one or more first linear guides (not shown, hidden from view by the housing 112, but substantially similar to the first linear guides 26 shown in FIGS. 1 and 2), which are substantially parallel to the first axis. The fastening system 110 further includes a plurality of second linear guides 128 which are substantially parallel to the second axes 122.

A template member 130 is configured to attach to the housing 112. However, the template member 130 is not permanently fastened to the housing 112, such that different template members (not shown) may be easily removed and replaced for use with the fastening system 110.

The template member 130 is configured to locate the spindles 116 relative to the housing 112 and to the first axis and the second axes 122. Therefore in order to switch between different patterns for the spindles 116: the spindles 116 are retracted away from the template member 130; the template member 130 is removed; another template member is placed into the housing 112; and the spindles 116 are readjusted or moved to be adjacent to the new template member. No disassembly of the spindles 116 is required, and no reconfiguration or retooling of the housing 112 or the base plate 114 is required. Furthermore, the spindles 116, individually and as a group, are adjustable by a single user or operator without substantial equipment, retooling, or physical effort.

The template member 130 may be further configured to react or counteract torque generated by the spindles 116. As the spindles 116 are used to drive fasteners (such as bolts), large amounts of torque may be created by each of the spindles 116. Therefore, the template member 130 also provides reactive structure to balance that torque.

Each of the plurality of spindles 116 (two of which are viewable from the side) drives a tool, such as a socket 134. The sockets 134 are substantially parallel to the axis of rotation of the spindles 116, which is not parallel to the third axis 124 in this configuration. As the fastening system 110 is lowered along the third axis 124, or the workpiece 132 is raised along the third axis 124, the spindles 116 are driven, such as by a power source 138 to apply torque to a plurality of fasteners 133 (shown in dashed lines) and drive the fasteners into the workpiece 132.

Additional movement or adjustability relative to the workpiece 132 may be achieved with the spindles 116. For example and without limitation, the spindles 116 may have spring-loaded sockets 134 or the spindles 116 may be configured to raise and lower the sockets 134. The sockets 134 may also be of variable length, providing additional flexibility in the number and type of workpieces 132 with which the fastening system 110 may be used.

Referring now to FIGS. 5A, 5B, 5C, and 5D, and with continued reference to FIGS. 1-4, there are shown schematic, top views of several different template members which may be used with the fastening system 10 shown in FIGS. 1-3, the fastening system 110 shown in FIG. 4, or other fastening systems. The specific shape of the interface between the spindles 16 and the selected template member shown is illustrative only.

Figure 5A:
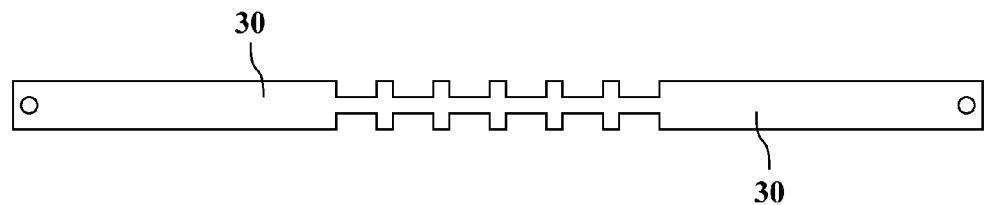
FIG. 5A is a schematic, top view of one template member usable with multi-spindle fastening systems similar to those described herein.
Figure 5B:
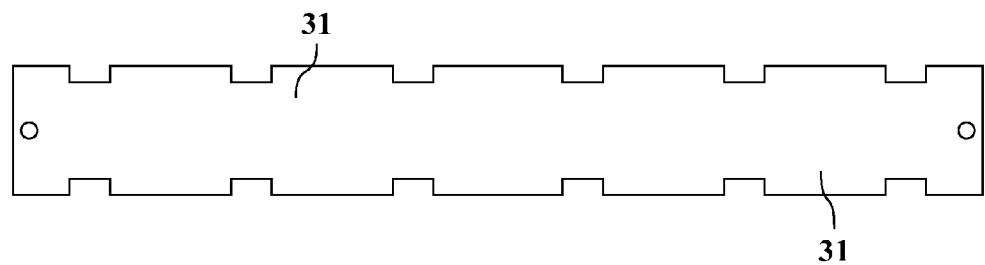
FIG. 5B is a schematic, top view of another template member usable with multi-spindle fastening systems similar to those described herein.

FIG. 5A shows the first template member 30, which is shown in the fastening system 10 in FIG. 1. FIG. 5B shows the second template member 31, which is shown in the fastening system 10 in FIGS. 2 and 3. Each of the spindles 16 cooperating with the first template member 30 or the second template member 31 may be independently positioned based upon the first template member 30 or the second template member 31. Therefore, the position of any specific spindle 16 is not generally controlled or limited by the position of another spindle 16, and the pattern of the spindles 16 and the driven fasteners 33 may be symmetric or asymmetric.

Figure 5C:
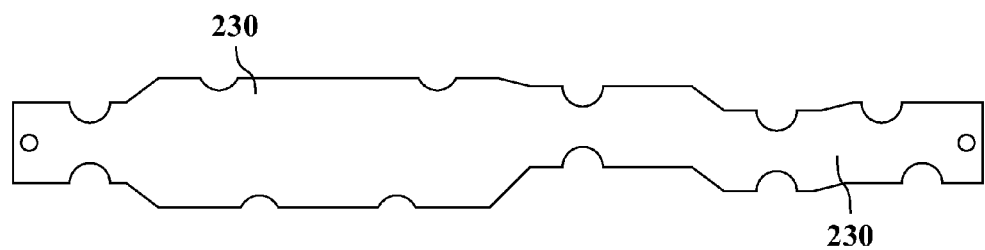
FIG. 5C is a schematic, top view of another template member usable with multi-spindle fastening systems similar to those described herein.

FIG. 5C shows a third template member 230, which is also usable with the fastening system 10 or similar systems. The third template member 230 includes rounded interfaces to provide positive location and torque reaction for the spindles 16. Each of the spindles 16 cooperating with the third template member 230 may be independently positioned based upon the third template member 230. Therefore, the position of any specific spindle 16 is not generally controlled or limited by the position of another spindle 16, and the pattern of the spindles 16 and a plurality of driven fasteners (such as, but limited to, the fasteners 33 shown in FIG. 3) may be symmetric or asymmetric.

Figure 5D:
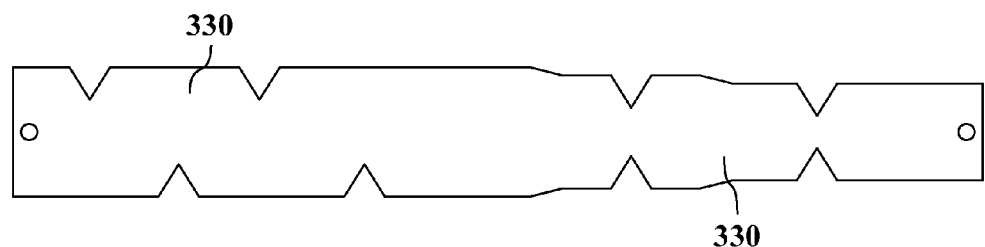
FIG. 5D is a schematic, top view of another template member usable with multi-spindle fastening systems similar to those described herein.

FIG. 5D shows a fourth template member 330, which is also usable with the fastening system 10 or similar systems. The fourth template member 330 includes rounded interfaces to provide positive location and torque reaction for the spindles 16. Each of the spindles 16 cooperating with the fourth template member 330 may be independently positioned based upon the fourth template member 330. Therefore, the position of any specific spindle 16 is not generally controlled or limited by the position of another spindle 16, and the pattern of the spindles 16 and a plurality of driven fasteners (such as, but limited to, the fasteners 33 shown in FIG. 3) may be symmetric or asymmetric.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A fastening system, comprising:
   a housing defining a first axis and a second axis, wherein the second axis is substantially perpendicular to the first axis;
   a plurality of spindles, wherein the plurality of spindles are not fixedly attached to the housing, wherein each of the plurality of spindles is moveable parallel to the first axis, and each of the plurality of spindles is moveable parallel to the second axis; and
   a template member configured to locate the plurality of spindles, wherein the template member is not permanently fastened to the housing and is not fixedly attached to the plurality of spindles, such that the spindles are independently moveable relative to the template member.

2. The fastening system of claim 1, wherein the template member is further configured to react torque generated by the plurality of spindles.

3. The fastening system of claim 2, further comprising:
   a first linear guide substantially parallel to the first axis;
   a plurality of second linear guides substantially parallel to the second axis and moveably attached to the first linear guide; and
   wherein each of the plurality of spindles is moveably attached to one of the second linear guides.

4. The fastening system of claim 3, wherein the housing includes a substantially-planar base plate.

5. The fastening system of claim 4, wherein the plurality of spindles are substantially parallel with a third axis, wherein the third axis is substantially perpendicular to the first axis and to the second axis.

6. The fastening system of claim 5, wherein the template member is substantially coaxial with one of the first axis and the second axis.

7. A fastening system for driving a plurality of fasteners, comprising:
   a housing having a base plate;
   a plurality of spindles configured to drive the plurality of fasteners, wherein the plurality of spindles are not fixedly attached to the housing;
   a first axis substantially parallel to the base plate, wherein each of the plurality of spindles is moveable parallel to the first axis;

a second axis substantially perpendicular to the first axis and substantially parallel to the base plate, wherein each of the plurality of spindles is moveable parallel to the second axis; and a template member configured to locate the plurality of spindles, wherein the template member is not permanently fastened to the housing and is not fixedly attached to the plurality of spindles, such that the spindles are independently moveable relative to the template member.

8. The fastening system of claim 7, further comprising:
a third axis substantially perpendicular to the first axis and to the second axis; and
wherein the plurality of spindles are configured to drive the plurality of fasteners substantially parallel to the third axis.

9. The fastening system of claim 8, further comprising:
a first linear guide substantially parallel to the first axis;
a plurality of second linear guides substantially parallel to the second axis and moveably attached to the first linear guide; and
wherein each of the plurality of spindles is moveably attached to one of the plurality of second linear guides.

10. The fastening system of claim 9, wherein the template member is further configured to react torque generated by the plurality of spindles.

11. A fastening system for driving a plurality of fasteners, comprising:

a housing having a base plate;
a plurality of spindles configured to drive the plurality of fasteners, wherein the plurality of spindles are not fixedly attached to the housing;
a first linear guide substantially parallel to the base plate;
a plurality of second linear guides substantially perpendicular to the first linear guide and substantially parallel to the base plate;
wherein each of the plurality of second linear guides is moveably attached to the first linear guide and each of the plurality of spindles is moveably attached to one of the plurality of second linear guides, such that each of the plurality of spindles is moveable along both the first linear guide and one of the plurality of second linear guides relative to the housing;
wherein the plurality of spindles are configured to drive the plurality of fasteners substantially perpendicular to the first linear guide and to the plurality of second linear guides; and
a template member configured to locate the plurality of spindles relative to the housing and to react torque generated by the plurality of spindles, wherein the template member is not permanently fastened to the housing and is not fixedly attached to the plurality of spindles, such that the spindles are independently moveable relative to the template member.

* * * * *